T. F. NIGHTINGALE.
PUZZLE BOX.
APPLICATION FILED APR. 4, 1914.
1,122,217.
Patented Dec. 22, 1914.
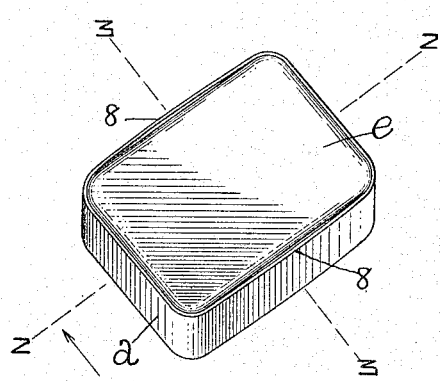
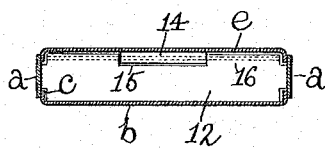
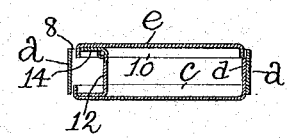
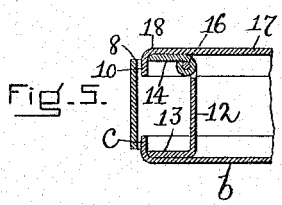
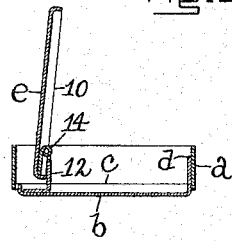
WITNESSES:
John Buckler,
J. Murphy
INVENTOR:
Thomas F. Nightingale
By Jas. H. Churchill
Atty.

UNITED STATES PATENT OFFICE.

THOMAS F. NIGHTINGALE, OF BOSTON, MASSACHUSETTS, ASSIGNOR OF ONE-HALF TO ARTHUR C. HIGGINS, OF SHREWSBURY, MASSACHUSETTS.

PUZZLE-BOX.

1,122,217.　　　　Specification of Letters Patent.　　Patented Dec. 22, 1914.

Application filed April 4, 1914. Serial No. 829,686.

*To all whom it may concern:*

Be it known that I, THOMAS F. NIGHTINGALE, a citizen of the United States, residing in Boston, in the county of Suffolk and State of Massachusetts, have invented an Improvement in Puzzle-Boxes, of which the following description, in connection with the accompanying drawings, is a specification, like characters on the drawings representing like parts.

This invention relates to a puzzle box, which is especially adapted for use as a match, cigarette or tobacco box.

The invention has for its object to provide a box whose upper and lower surfaces are alike in appearance, yet one is fixed and the other is movable to form the cover for the box, and in its closed position cannot be easily distinguished from the bottom and offers no clue to the uninitiated how it can be opened.

The particular features of the invention will be pointed out in the claims at the end of this specification.

Figure 1 represents a box embodying this invention. Fig. 2, a section on the line 2—2 Fig. 1. Fig. 3, a section on the line 3—3 Fig. 1. Fig. 4, a section on the line 3—3 with the cover in its open position and Fig. 5, an enlarged detail in section to be referred to.

In accordance with this invention, the box is composed of three members or parts $a$, $b$ and $c$, preferably of sheet metal. The member $a$ constitutes the body portion of the box and is made as an oblong frame which is open at its top and bottom and forms the sides and ends of the box. The member $b$ constitutes the bottom of the box and is provided with an upturned flange $c$ at its sides and ends, which fits snugly into the bottom of the body member $a$ and may be soldered or otherwise fastened thereto. The flange $c$ on one side of the bottom member may and preferably will be made higher than the flange on the other side and ends, so as to form a stop $d$ for the cover as will be described. The member $e$ constitutes the movable cover for the box, and is made similar to the bottom member $b$ and is provided with a flange 10 at its sides and ends, which fits into the top of the body member $a$ and in the closed position of the cover abuts against the stop or extended portion $d$ of the flange $c$ on the bottom member.

The cover member $e$ is pivoted within the box to a vertical wall or hinge member 12, which is extended lengthwise of the box and has a bottom flange 13 which is soldered or otherwise secured to the bottom member $b$. In the present instance, the cover member $e$ has soldered or otherwise secured to its underside a hinge member 14, which extends into a slot 15 in the hinge member 12, said hinge members supporting a pintle 16. The hinge member 14 is secured to the under side of the cover $e$ a short distance from one side to convert the cover into a lever having a substantially long arm 17 and a substantially short arm 18, the long arm 17 in the closed position of the cover engaging the flange or stop $d$, which necessitates that the short arm 18 be employed to open the cover. The sides of the body portion with which the cover coöperates, are bent or sprung outwardly slightly at the central portion of the upper edges of said sides, as at 8, see Figs. 1, 3 and 5, so as to cause the corners of the body member $a$ to engage the flange 10 on the cover, with sufficient friction to prevent the cover being accidentally opened and to require considerable pressure downwardly on the short arm 18 of the cover to turn it on its hinge or pivot, thereby avoiding opening of the cover by a slight pressure applied to the cover on the short arm of the lever. The spring of the sides of the box member on their upper edges is so slight, as to have the appearance of the upper side of the box when the cover is closed, so nearly like the appearance of the bottom of the box as to puzzle the person to whom the box is handed, to determine which is the cover and which is the bottom and how to open the cover, yet this spring is sufficient to create the friction necessary or desired to hold the cover in its closed position from being opened accidentally or by slight pressure initially or after the cover has been opened a substantially large number of times. The box herein shown and above described is therefore not only useful but also is a source of amusement, and serves as a puzzle.

The box may and preferably will be used for holding matches but it is not desired to limit the invention in this respect, as it may be used for holding other articles such as cigarettes, tobacco, etc.

Claims:

1. A box of the character described comprising a body member open at its top and bottom, and forming the sides and ends of the box, a bottom member having a flange inserted into the bottom of the body member and secured thereto, said flange on one side being extended to near the top of the body member, a cover member provided with a flange extended into the open top of said body member and coöperating with the extended portion of the flange on the bottom member, a hinge member attached to said bottom member, and a hinge member attached to the underside of the cover member, said hinge members being located nearer one side of the box than the other to provide the cover with a long and a short arm, substantially as described.

2. A box of the character described, comprising a body member open at its top and bottom and forming the sides and ends of the box, the sides of said body member being sprung slightly outward at their upper edges, a bottom member having a flange inserted into the bottom of the body member and secured thereto, a cover member having a flange extended into the open top of the body member and frictionally engaged with the corners of the upper edges of said body member, and means for pivoting the cover within the box nearer one side than the other, substantially as described.

3. A box of the character described comprising a body member open at its top and bottom and forming the sides and ends of the box, a bottom member having a flange inserted into the bottom of the body member and secured thereto, a cover member provided with a flange extended into the open top of said body member, a hinge member attached to said bottom member, and a hinge member attached to the underside of the cover member, said hinge members being located nearer one side of the box than the opposite side, substantially as described.

In testimony whereof, I have signed my name to this specification in the presence of two subscribing witnesses.

THOMAS F. NIGHTINGALE.

Witnesses:
 JAS. H. CHURCHILL,
 J. MURPHY.

Copies of this patent may be obtained for five cents each, by addressing the "Commissioner of Patents, Washington, D. C."